(12) United States Patent
Yang et al.

(10) Patent No.: US 7,970,790 B2
(45) Date of Patent: Jun. 28, 2011

(54) CELL-BASED SECURITY REPRESENTATION FOR DATA ACCESS

(75) Inventors: Mark Yang, Sammamish, WA (US); Anton Amirov, Redmond, WA (US); Jonathan Tang, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 474 days.

(21) Appl. No.: 12/120,228

(22) Filed: May 13, 2008

(65) Prior Publication Data

US 2009/0287704 A1 Nov. 19, 2009

(51) Int. Cl.
*G06F 7/00* (2006.01)
*G06F 17/30* (2006.01)
(52) U.S. Cl. ..................................................... 707/783
(58) Field of Classification Search .................... None
See application file for complete search history.

(56) References Cited

U.S. PATENT DOCUMENTS

| | | | |
|---|---|---|---|
| 5,940,818 A | 8/1999 | Malloy et al. | |
| 6,592,626 B1 | 7/2003 | Bauchot et al. | |
| 7,155,612 B2 | 12/2006 | Licis | |
| 7,200,595 B2 | 4/2007 | Dutta et al. | |
| 7,243,097 B1 | 7/2007 | Agrawal et al. | |
| 7,340,770 B2 | 3/2008 | Freund | |
| 2002/0095405 A1 | 7/2002 | Fujiwara | |
| 2005/0177570 A1 | 8/2005 | Dutta et al. | |
| 2005/0289342 A1 | 12/2005 | Needham et al. | |
| 2006/0010118 A1 | 1/2006 | Sattler et al. | |
| 2006/0206485 A1 | 9/2006 | Rubin et al. | |

FOREIGN PATENT DOCUMENTS

WO 2007080562 A1 7/2007

OTHER PUBLICATIONS

"Introduction to MOSS Security Architecture", 2006, ARB Security Solutions, LLC, 2 pages.
Rask, et al., "Implementing Row- and Cell-Level Security in Classified Databases Using SQL Server 2005", Apr. 1, 2005, Microsoft Corporation, 7 pages.
"Cell-Level Security in SQL Server 7.0 OLAP Services", 2007, Microsoft Corporation, 2 pages.
"Website Security & Authentication Software", 2000-2006, InetSolution, Inc., 20 pages.
International Search Report, mailed Nov. 24, 2009, 13 pages.

*Primary Examiner* — Uyen T. Le

(57) ABSTRACT

Architecture for cell-based security on a per-user basis. A security model for this capability includes not only dimension level tables, but is extended to include cell level tables. The security model can include existing dimension tables, plus cell security tables that include a cell permissions table, a cell qualifiers table and a table that includes both the cell permissions table, a cell qualifiers. Metadata associated with the security applied to the cells for a given user can be stored locally in a local metadata store for retrieval and application against a data cube that an authenticated and authorized user is querying. In a specific implementation, the cell level security is employed in a performance management server application, where authentication is performed remotely by an authentication service, but the authorization function is performed local to the performance management server application.

20 Claims, 10 Drawing Sheets

CELL-BASED SECURITY REPRESENTATION FOR DATA ACCESS

BACKGROUND

The ubiquitous nature of networks, data and clients has not only made access to data more efficient for the corporate environment but also imposes greater control and management requirements to prevent unintended access to the networks and data. No longer is it a common practice to give unfettered access to corporate data to any one user. Databases have now become an enormous amalgam of all kinds of information related to human resources, financials, product development, project planning, and so on. However, employees still need access to certain datasets to provide the requested information.

To be more effective, conventional solutions provide a hierarchy of security levels to restrict access to systems, and data. Database systems provide table security that limits access to the tables based on user permissions, for example. However, these tables can include a large number of rows and columns, some of the information which the user should be given access and some for which no access should be allowed. Other techniques for restricting access to tables include the user of security tags, and by way of security logins for the table itself. Each of these and other convention techniques do not provide a solution for allowing an administrator to selectively limit access to data yet carve out a dataset for a user to access and view.

SUMMARY

The following presents a simplified summary in order to provide a basic understanding of some novel embodiments described herein. This summary is not an extensive overview, and it is not intended to identify key/critical elements or to delineate the scope thereof. Its sole purpose is to present some concepts in a simplified form as a prelude to the more detailed description that is presented later.

The disclosed architecture facilitates cell-based security on a per-user basis. The security model for this capability includes not only dimension level tables, but is extended to include cell level tables. An alternative implementation can employ cell level security table similar to a fact table in a database application.

In a specific implementation, the cell level security can be employed in a performance management server application. Authentication can be performed remotely by an authentication service of another application, such as a server application that provides capabilities and functionality compatible with the performance management server application. However, the authorization function can be performed local to the performance management server application.

The security model can include existing dimension tables, plus cell security tables that include a cell permissions table, a cell qualifiers table and a table that includes both the cell permissions table, a cell qualifiers. Metadata associated with the security applied to the cells for a given user can be stored locally in the server application metadata store for retrieval and application against a data cube that an authenticated and authorized user is querying. The filtered results are then presented to the user.

To the accomplishment of the foregoing and related ends, certain illustrative aspects are described herein in connection with the following description and the annexed drawings. These aspects are indicative of the various ways in which the principles disclosed herein can be practiced, all aspects and equivalents of which are intended to be within the scope of the claimed subject matter. Other advantages and novel features will become apparent from the following detailed description when considered in conjunction with the drawings.

DETAILED DESCRIPTION

Figure 1:
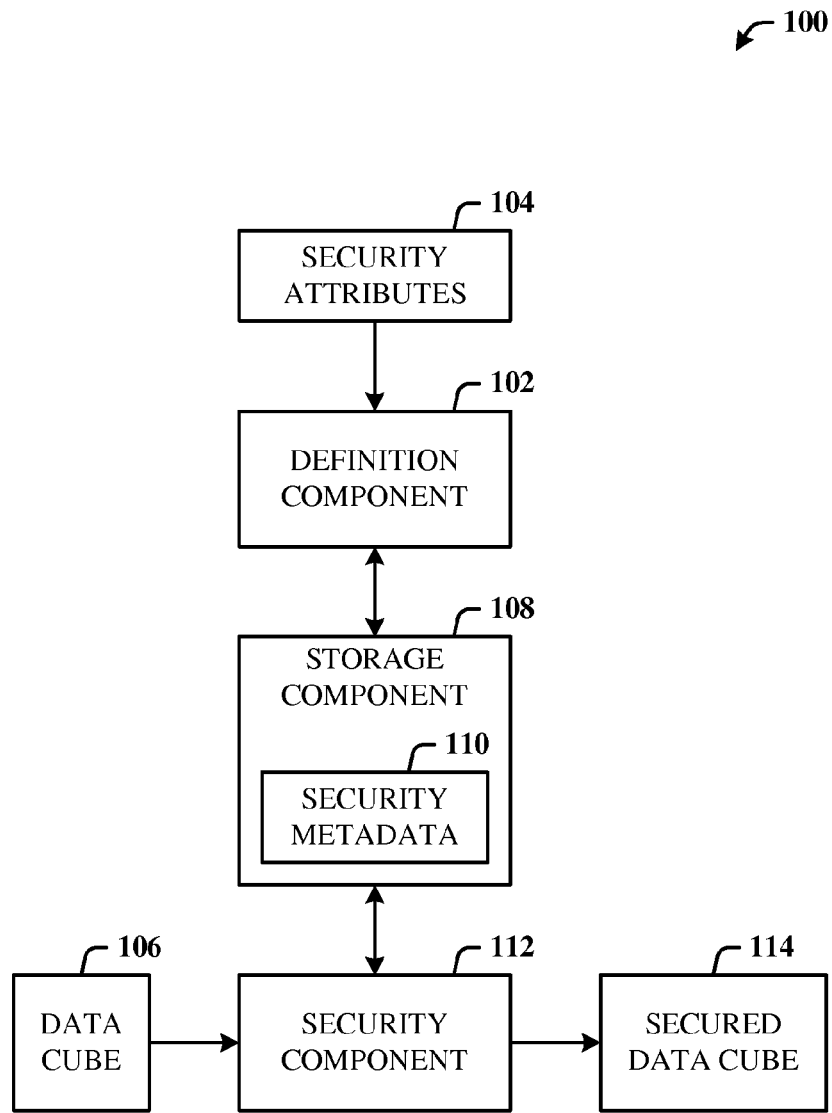
FIG. 1 illustrates a computer-implemented data security system.

The disclosed architecture facilitates cell-based security on a per-user basis. A security model for this capability includes not only dimension level tables, but is extended to include cell level tables. The security model can include existing dimension tables, plus cell security tables that include a cell permissions table, a cell qualifiers table and a table that includes both the cell permissions table, a cell qualifiers. Metadata associated with the security applied to the cells for a given user can be stored locally in a local metadata store for retrieval and application against a data cube that an authenticated and authorized user is querying. In a specific implementation, the cell level security is employed in a performance management server application, where authentication is performed remotely by an authentication service, but the authorization function is performed local to the performance management server application.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well-known structures and devices are shown in block diagram form in order to facilitate a description thereof. The intention is to cover all modifications, equivalents, and alternatives falling within the spirit and scope of the claimed subject matter.

FIG. 1 illustrates a computer-implemented data security system 100. The system 100 includes a definition component 102 for defining security attributes 104 for cells of a data cube 106. A storage component 108 is provided for storing the attributes 104 as security metadata 110 for application to the data cube 106 based on a user query. The system 100 can also include a security component 112 for applying the security metadata 110 to the data cube 106 to generate a secured data cube 114 based on the use query.

The security attributes 104 can be defined on a per-user basis, and can include permissions for read access, read-contingent, read/write access, or no access to the cells. The system 100 can further include user interface via which a user can define the security attributes 104 for a user according to dimensions and measures.

The definition component 102 also facilitates the defining of dimension attributes, and stores the dimension attributes as part of the security metadata 110. The definition component 102 and the storage component 108 can be part of a performance management application for securing data cubes cells on a per-user basis.

As will be described hereinbelow, the security metadata 110 can be stored as a set of security tables, where the security tables include a table of cell permissions, a table of cell qualifiers and, a table of both cell permissions and cell qualifiers.

Figure 2:
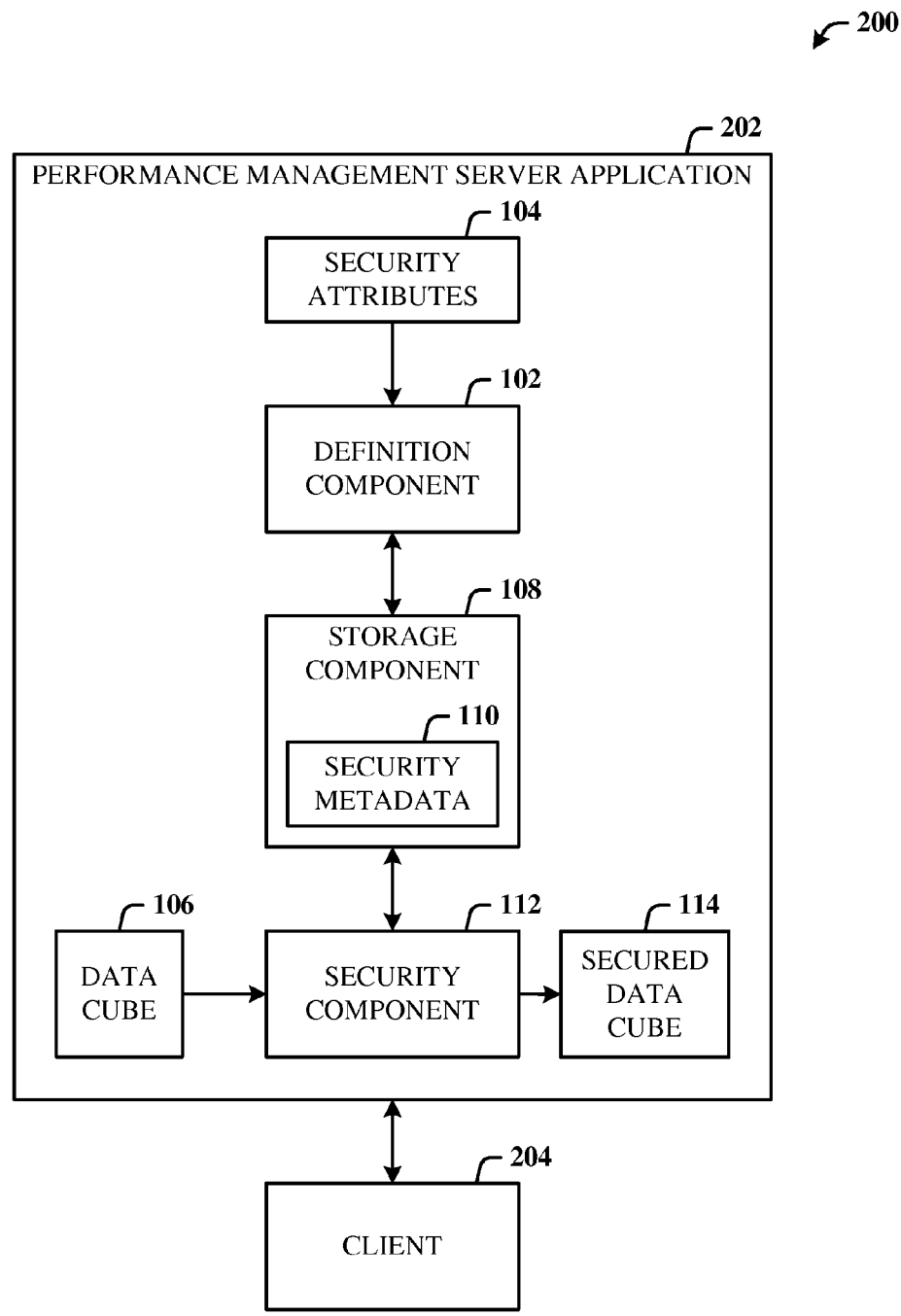
FIG. 2 illustrates a system where a performance management server application includes the system of FIG. 1.

FIG. 2 illustrates a system 200 where a performance management server application 202 includes the system 100 of FIG. 1. The application 202 can be a web application accessible by a client 204 via a browser or browser-like client application. In operation, the user can access the server application 202, access the definition component 102 to assign the security attributes 104 to cells of data in a database, for example. These assignments are then stored as the security metadata 110 via the storage component 108. When a query is received from the user for whom the security attributes 104 were imposed, the security metadata is retrieved and applied to the data cube to create the secured data cube for that specific user. Query results are then returned to the user in a filtered state based on the security attributes 104. Note that the user can be another software entity (e.g., system or method) seeking access to the data cube 106. Thus, the security attributes 104 can be assigned based on a specific system or other software module, as well.

In other words, the data security system of the performance management server application 202 includes a definition component for defining security attributes for dimensions and measures of a data cube, a storage component for storing the attributes as security metadata in the performance management application, and a security component for applying the security metadata to the dimensions and measures of the data cube to generate a secured data cube based on a user. The security metadata is stored as a set of tables where the tables include a table of cell permissions, a table of cell qualifiers and, a table of both cell permissions and cell qualifiers. The security attributes include read access, read-contingent, read/write access, or no access to the cells applied on a per-user basis in the secured data cube, and are stored as a cell-level security table. The application 202 can also include a user interface via which to assign the security attributes to the dimensions and measures for a specific user.

Since the measures are known, the user interface can be used to define cell security (e.g., read, read-contingent, and read/write, no access) on measures with qualifiers on dimensions. A qualifier is similar to dimension security. The security attributes for a cell of the secured data cube can be exposed via the user interface when the user interacts with the cell.

Figure 3:
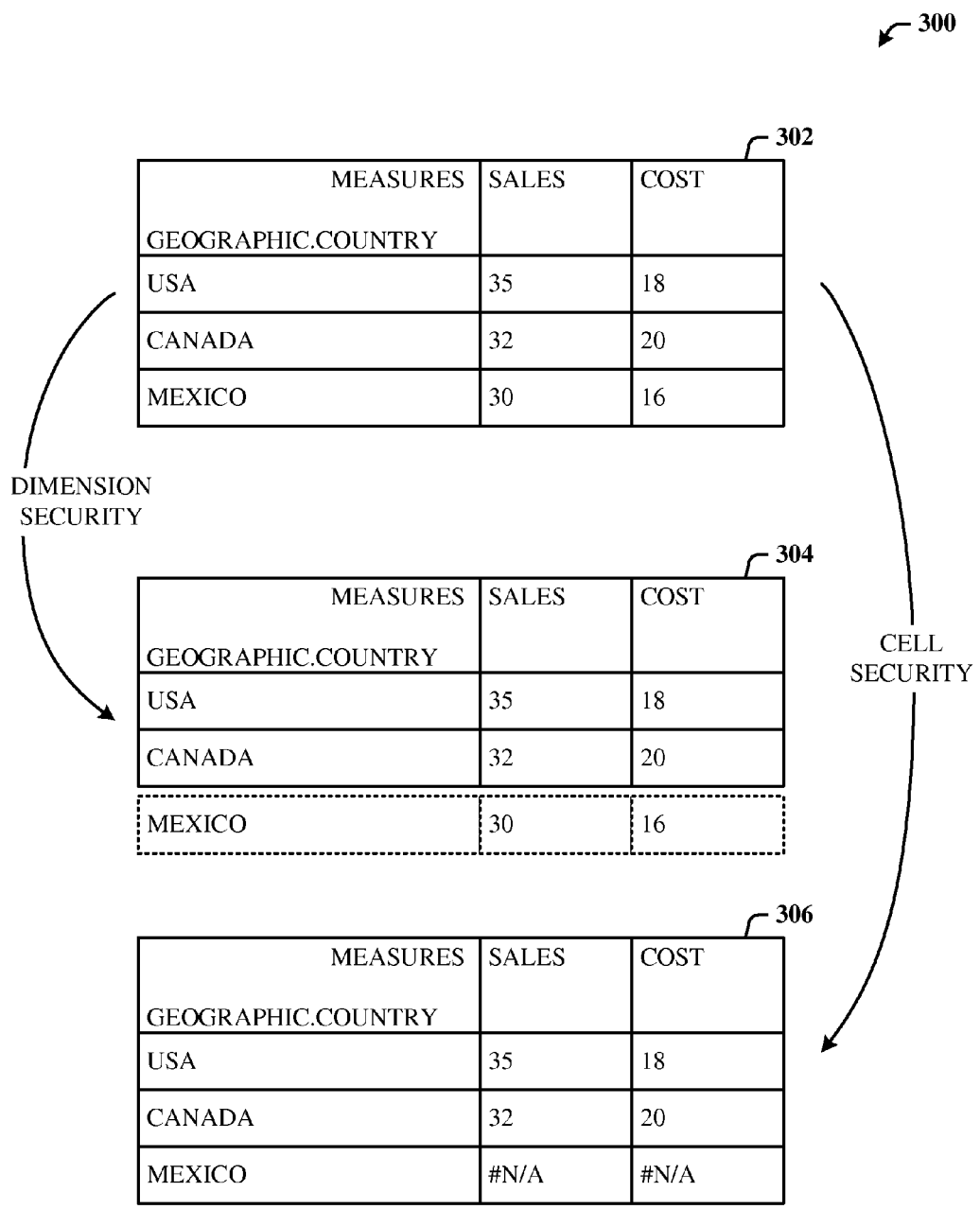
FIG. 3 illustrates dimension and cell security in data tables.

FIG. 3 illustrates dimension and cell security in data tables 300. Table 302 shows all rows and columns of a simple table of geographic dimension data and, sales and cost measure data. Without any security, the user will see the data in table 302, the dimensions for the geographic countries USA, Canada, and Mexico, and measures for Sales and Cost. Table 304 represents the data exposed when applying dimension security. Here, the user is blocked from receiving and viewing data for the Mexico geographic dimension, which also blocks access to the Sales and Cost (the entire row will not be allowed to be viewed, as indicated by the dotted boundary for the whole row). Table 306 represents the use of cell security to the Mexico dimension. The user is allowed to see that Mexico is part of the results of the query but the user is not allowed to see the Sales and Cost values. Thus, cell-based security allows a more informative information but with more granular control of the data that can be exposed based on the user desiring to see the data.

Figure 4:
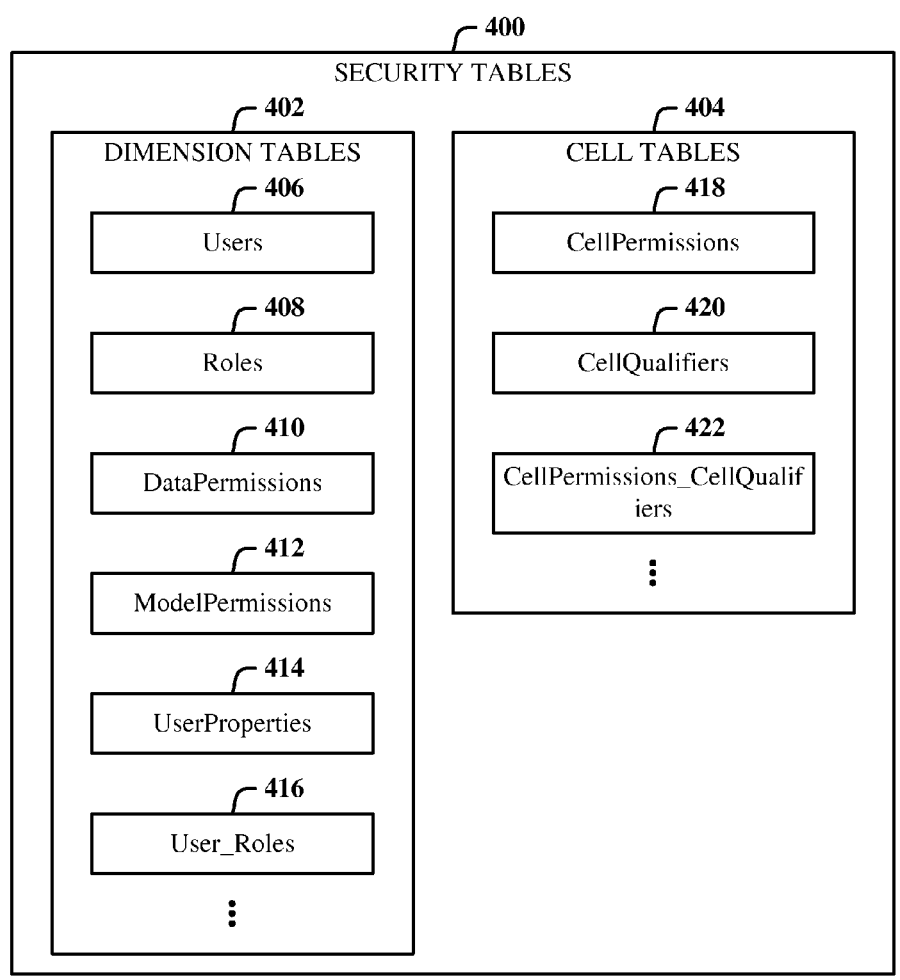
FIG. 4 illustrates an exemplary set of security tables that can be employed to provide cell-level security.

FIG. 4 illustrates an exemplary set of security tables 400 that can be employed to provide cell-level security. The security tables 400 include both dimension tables 402 and cell tables 404. The dimension tables 402 can include a users table 406, roles table 408, data permissions table 410, model permissions table 412, user properties table 414, user roles table 416, and other dimension tables as desired. The cell tables 404 can include a cell permissions table 418, a cell qualifiers table 420, a combination table 422 that includes both cell qualifiers and cell permissions, and other cell tables as desired. The cell qualifiers table 420 can be a subset of the cell permission table 418. The cell permissions table 418 can include columns such as cell permission ID, model permission ID, measure, permission, and so on. At deployment (or save) time, the security information from the cell tables 404 is used to create corresponding cell security on the data cubes.

Figure 5:
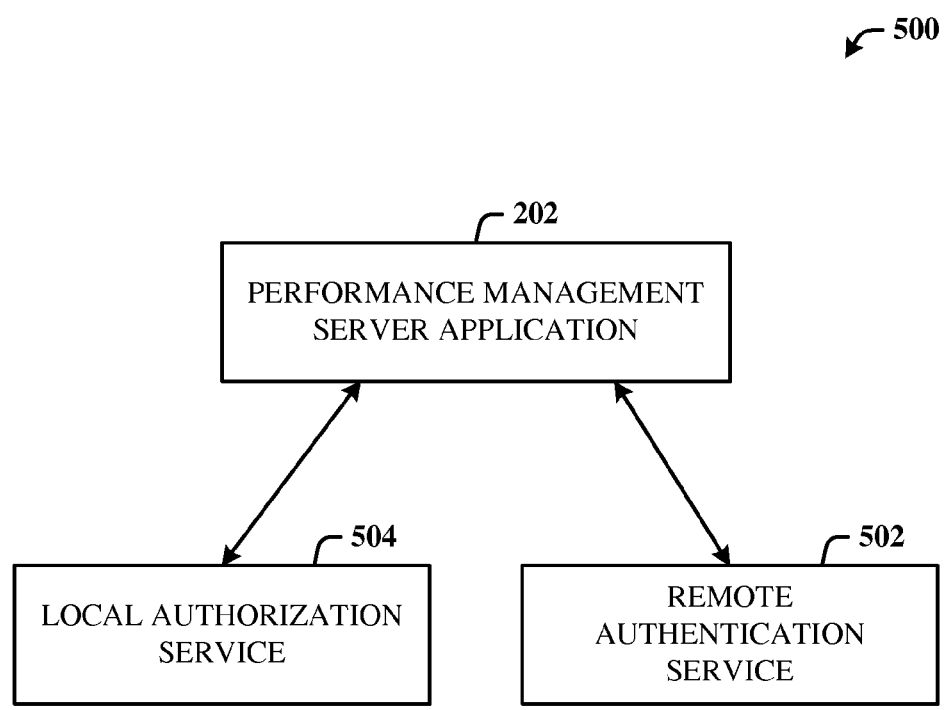
FIG. 5 illustrates an authentication and authorization scheme for the performance management server application.

FIG. 5 illustrates an authentication and authorization scheme for the performance management server application 202. As indicated, authentication can be performed by a remote authentication service 502, such as can be employed in a companion server application with which the server application 202 is installed. Authorization, on the other hand, can be performed locally by a local authorization service of the server application 202. Note that authorization is the granting of specific permissions to an entity or a user, while authentication is the establishment of an identity relative to another entity. For example, the identity can be a client, a user, a computer, etc.

Dimension and cell security stored in the performance management server application 202 is used for authorization. To leverage a remote authentication service, the performance management server application 202 can be packaged as a shared service of the remote service, thereby exposing the web service. After the remote authentication service authenticates the user, the remote service object model can be used to retrieve user-related information from the remote service. Thus, the local User table is reduced to minimum to maintain a mapping between remote User table and a local table user ID.

Following is a series of flow charts representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

Figure 6:
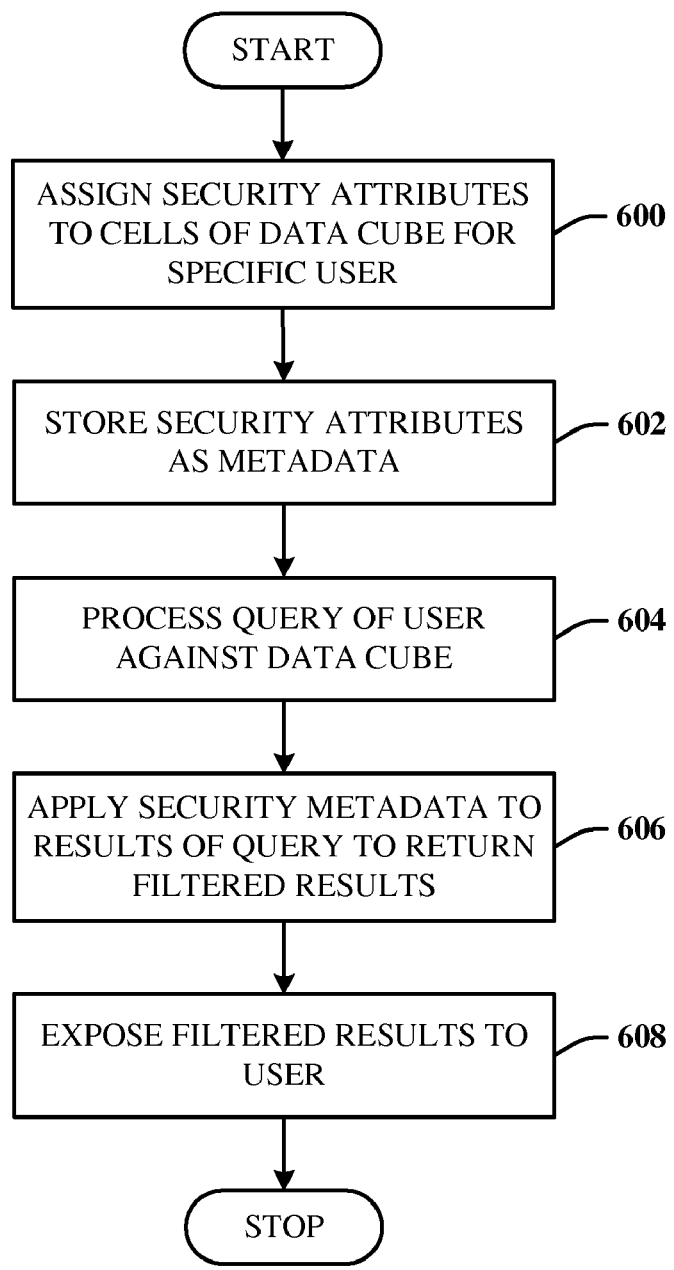
FIG. 6 illustrates a computer-implemented method of securing data.

FIG. 6 illustrates a computer-implemented method of securing data. At 600, security attributes are assigned to cells of a data cube for a specific user. The security attributes can be previously-defined attributes by another user such as an administrator, or another user. At 602, the security attributes are then stored as metadata. The metadata can be stored locally with other metadata. At 604, a query of the user is received and processing against the data cube. At 606, the security metadata is applied to the results of query to return filtered results. At 608, the filtered results are exposed (presented) to the user.

In a specific implementation in a performance management server application, the security attributes can be defined and stored in the performance management server metadata store. This can be facilitated via a web service interface, for example.

As previously indicated, the security attributes include dimension security attributes related to users, roles, data permissions, model permissions, user properties and user roles, and the security attributes include cell security attributes related to cell permissions, cell qualifiers, and a combination of cell permissions and cell qualifiers.

Figure 7:
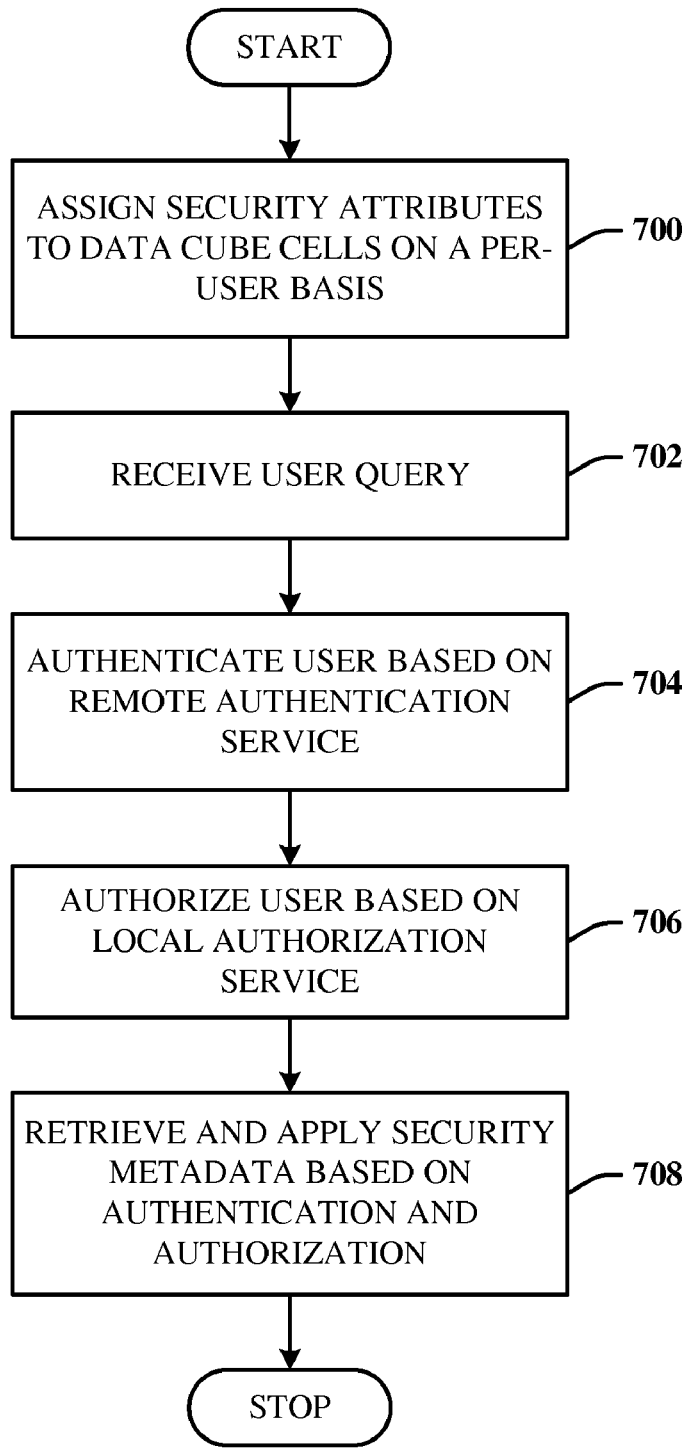
FIG. 7 illustrates a method of authenticating and authorizing cell-based security.

FIG. 7 illustrates a method of authenticating and authorizing cell-based security. At 700, security attributes are assigned to data cube cells on a per-user basis. At 702, a user creates and sends a query. At 704, the user is authenticated based on a remote authentication service or module. At 706, the user is authorized based on a local authorization service or module. At 708, security metadata is retrieved and applied based on successful authentication and authorization of the user.

Figure 8:
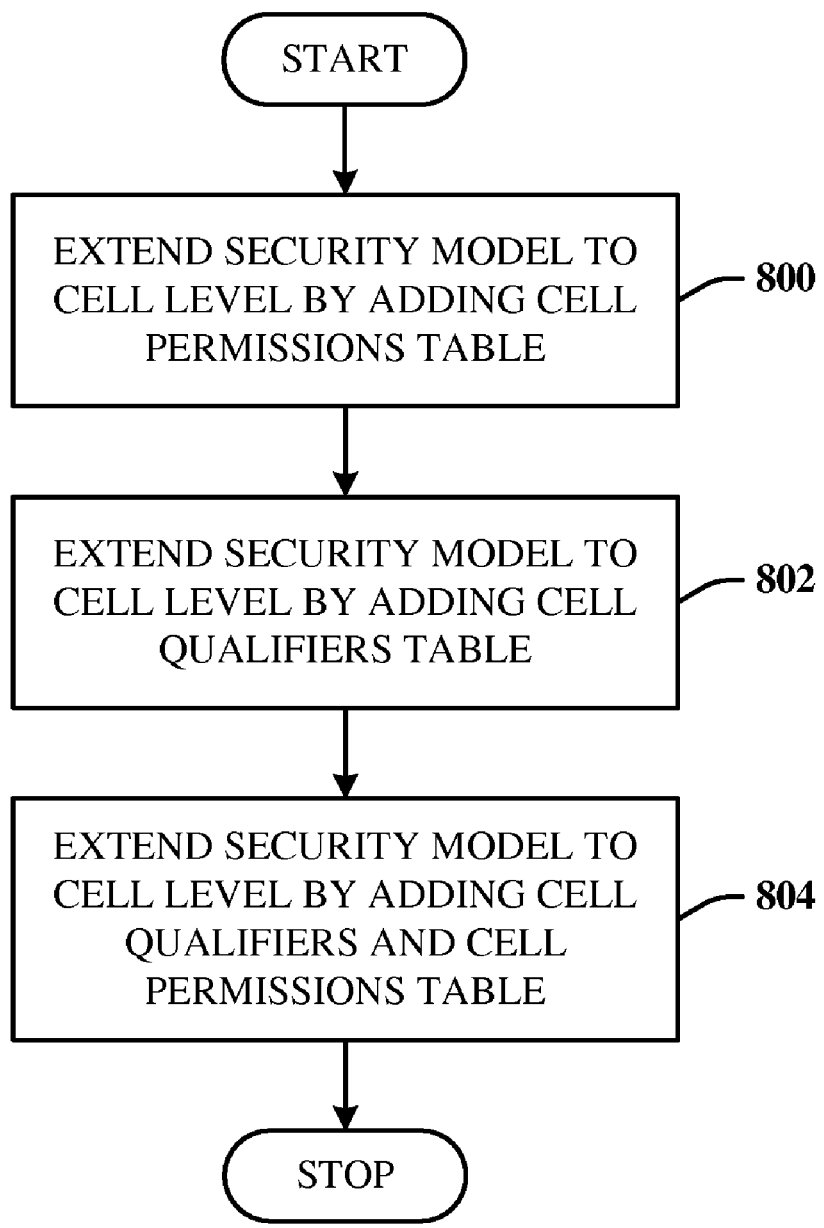
FIG. 8 illustrates a method of providing cell-based security by extending the security model.

FIG. 8 illustrates a method of providing cell-based security by extending the security model. At 800, the security model is extended by adding a cell permissions table. At 802, the security model is extended by adding a cell qualifiers table. At 804, the security model is extended by adding a combined cell permission and cell qualifiers table. This can also include storing a user identifier of the user in the tables to link the tables to the user.

As used in this application, the terms "component" and "system" are intended to refer to a computer-related entity, either hardware, a combination of hardware and software, software, or software in execution. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. The word "exemplary" may be used herein to mean serving as an example, instance, or illustration. Any aspect or design described herein as "exemplary" is not necessarily to be construed as preferred or advantageous over other aspects or designs.

Figure 9:
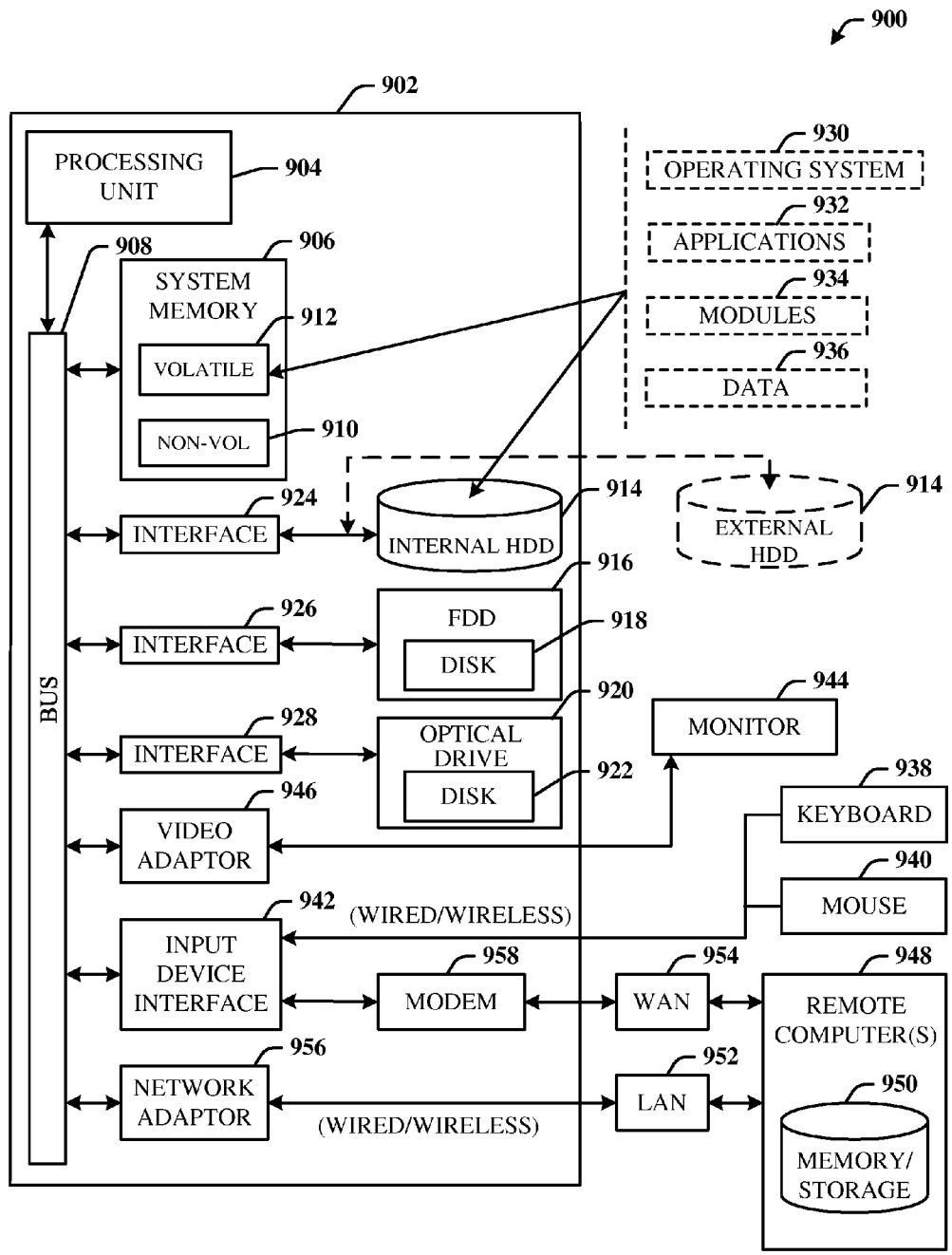
FIG. 9 illustrates a block diagram of a computing system operable to execute cell-based security in accordance with the disclosed architecture.

Referring now to FIG. 9, there is illustrated a block diagram of a computing system 900 operable to execute cell-based security in accordance with the disclosed architecture. In order to provide additional context for various aspects thereof, FIG. 9 and the following discussion are intended to provide a brief, general description of a suitable computing system 900 in which the various aspects can be implemented. While the description above is in the general context of computer-executable instructions that may run on one or more computers, those skilled in the art will recognize that a novel embodiment also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects can also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes volatile and non-volatile media, removable and non-removable media. By way of example, and not limitation, computer-readable media can comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital video disk (DVD) or other optical disk storage, magnetic cassettes, magnetic tape, magnetic disk storage or other magnetic storage devices, or any other medium which can be used to store the desired information and which can be accessed by the computer.

With reference again to FIG. 9, the exemplary computing system 900 for implementing various aspects includes a computer 902 having a processing unit 904, a system memory 906 and a system bus 908. The system bus 908 provides an interface for system components including, but not limited to, the system memory 906 to the processing unit 904. The processing unit 904 can be any of various commercially available processors. Dual microprocessors and other multi-processor architectures may also be employed as the processing unit 904.

The system bus 908 can be any of several types of bus structure that may further interconnect to a memory bus (with or without a memory controller), a peripheral bus, and a local bus using any of a variety of commercially available bus architectures. The system memory 906 can include non-volatile memory (NON-VOL) 910 and/or volatile memory 912 (e.g., random access memory (RAM)). A basic input/output system (BIOS) can be stored in the non-volatile memory 910 (e.g., ROM, EPROM, EEPROM, etc.), which BIOS are the basic routines that help to transfer information between elements within the computer 902, such as during start-up. The volatile memory 912 can also include a high-speed RAM such as static RAM for caching data.

The computer 902 further includes an internal hard disk drive (HDD) 914 (e.g., EIDE, SATA), which internal HDD 914 may also be configured for external use in a suitable chassis, a magnetic floppy disk drive (FDD) 916, (e.g., to read from or write to a removable diskette 918) and an optical disk drive 920, (e.g., reading a CD-ROM disk 922 or, to read from or write to other high capacity optical media such as a DVD). The HDD 914, FDD 916 and optical disk drive 920 can be connected to the system bus 908 by a HDD interface 924, an FDD interface 926 and an optical drive interface 928, respectively. The HDD interface 924 for external drive implementations can include at least one or both of Universal Serial Bus (USB) and IEEE 1394 interface technologies.

The drives and associated computer-readable media provide nonvolatile storage of data, data structures, computer-executable instructions, and so forth. For the computer 902, the drives and media accommodate the storage of any data in a suitable digital format. Although the description of computer-readable media above refers to a HDD, a removable magnetic diskette (e.g., FDD), and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing novel methods of the disclosed architecture.

A number of program modules can be stored in the drives and volatile memory 912, including an operating system 930, one or more application programs 932, other program modules 934, and program data 936. When employing the computer 902 as a server machine, the one or more application programs 932, other program modules 934, and program data 936 can include the definition component 102, the security attributes, the data cube 106, the storage component 108, the security metadata 110, the security component 112, the secured data cube 114, the performance management server application 202, the tables 300, the security table 400, the local authorization service 504, and the methods in FIGS. 7, 8, and 9, for example.

All or portions of the operating system, applications, modules, and/or data can also be cached in the volatile memory 912. It is to be appreciated that the disclosed architecture can be implemented with various commercially available operating systems or combinations of operating systems.

A user can enter commands and information into the computer 902 through one or more wire/wireless input devices, for example, a keyboard 938 and a pointing device, such as a mouse 940. Other input devices (not shown) may include a microphone, an IR remote control, a joystick, a game pad, a stylus pen, touch screen, or the like. These and other input devices are often connected to the processing unit 904 through an input device interface 942 that is coupled to the system bus 908, but can be connected by other interfaces such as a parallel port, IEEE 1394 serial port, a game port, a USB port, an IR interface, etc.

A monitor 944 or other type of display device is also connected to the system bus 908 via an interface, such as a video adaptor 946. In addition to the monitor 944, a computer typically includes other peripheral output devices (not shown), such as speakers, printers, etc.

The computer 902 may operate in a networked environment using logical connections via wire and/or wireless communications to one or more remote computers, such as a remote computer(s) 948. The remote computer(s) 948 can be a workstation, a server computer, a router, a personal computer, portable computer, microprocessor-based entertainment appliance, a peer device or other common network node, and typically includes many or all of the elements described relative to the computer 902, although, for purposes of brevity, only a memory/storage device 950 is illustrated. The logical connections depicted include wire/wireless connectivity to a local area network (LAN) 952 and/or larger networks, for example, a wide area network (WAN) 954. Such LAN and WAN networking environments are commonplace in offices and companies, and facilitate enterprise-wide computer networks, such as intranets, all of which may connect to a global communications network, for example, the Internet.

When used in a LAN networking environment, the computer 902 is connected to the LAN 952 through a wire and/or wireless communication network interface or adaptor 956. The adaptor 956 can facilitate wire and/or wireless communications to the LAN 952, which may also include a wireless access point disposed thereon for communicating with the wireless functionality of the adaptor 956.

When used in a WAN networking environment, the computer 902 can include a modem 958, or is connected to a communications server on the WAN 954, or has other means for establishing communications over the WAN 954, such as by way of the Internet. The modem 958, which can be internal or external and a wire and/or wireless device, is connected to the system bus 908 via the input device interface 942. In a networked environment, program modules depicted relative to the computer 902, or portions thereof, can be stored in the remote memory/storage device 950. It will be appreciated that the network connections shown are exemplary and other means of establishing a communications link between the computers can be used.

The computer 902 is operable to communicate with wire and wireless devices or entities using the IEEE 802 family of standards, such as wireless devices operatively disposed in wireless communication (e.g., IEEE 802.11 over-the-air modulation techniques) with, for example, a printer, scanner, desktop and/or portable computer, personal digital assistant (PDA), communications satellite, any piece of equipment or location associated with a wirelessly detectable tag (e.g., a kiosk, news stand, restroom), and telephone. This includes at least Wi-Fi (or Wireless Fidelity), WiMax, and Bluetooth™ wireless technologies. Thus, the communication can be a predefined structure as with a conventional network or simply an ad hoc communication between at least two devices. Wi-Fi networks use radio technologies called IEEE 802.11x (a, b, g, etc.) to provide secure, reliable, fast wireless connectivity. A Wi-Fi network can be used to connect computers to each other, to the Internet, and to wire networks (which use IEEE 802.3-related media and functions).

Figure 10:
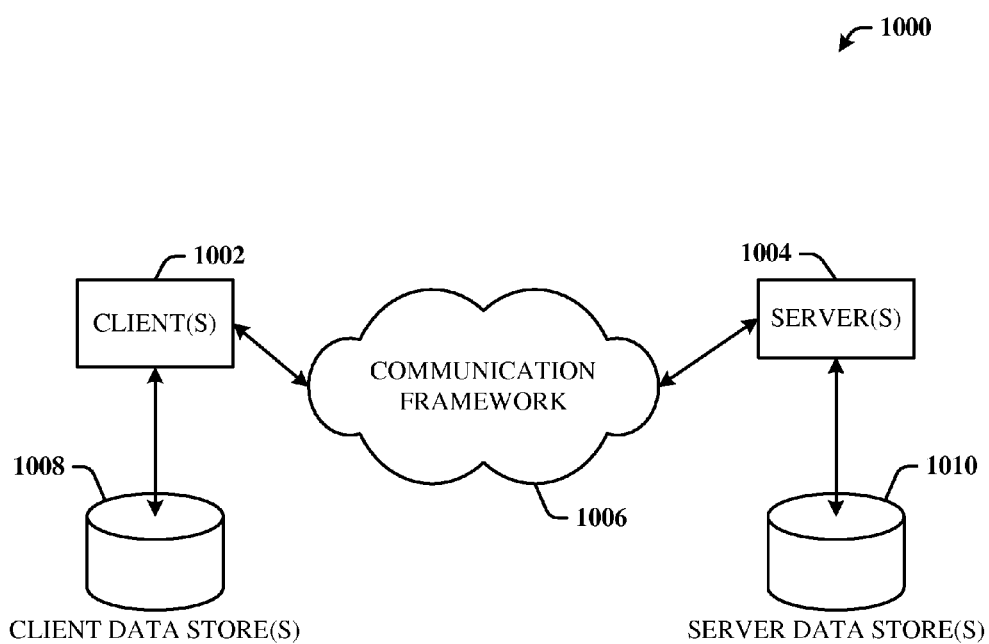
FIG. 10 illustrates a schematic block diagram of an exemplary computing environment that facilitates cell-based security in a performance management server application.

Referring now to FIG. 10, there is illustrated a schematic block diagram of an exemplary computing environment 1000 that facilitates cell-based security in a performance management server application. The environment 1000 includes one or more client(s) 1002. The client(s) 1002 can be hardware and/or software (e.g., threads, processes, computing devices). The client(s) 1002 can house cookie(s) and/or associated contextual information, for example.

The environment 1000 also includes one or more server(s) 1004. The server(s) 1004 can also be hardware and/or software (e.g., threads, processes, computing devices). The servers 1004 can house threads to perform transformations by employing the architecture, for example. One possible communication between a client 1002 and a server 1004 can be in the form of a data packet adapted to be transmitted between two or more computer processes. The data packet may include a cookie and/or associated contextual information, for example. The environment 1000 includes a communication framework 1006 (e.g., a global communication network such as the Internet) that can be employed to facilitate communications between the client(s) 1002 and the server(s) 1004.

Communications can be facilitated via a wire (including optical fiber) and/or wireless technology. The client(s) 1002 are operatively connected to one or more client data store(s) 1008 that can be employed to store information local to the client(s) 1002 (e.g., cookie(s) and/or associated contextual information). Similarly, the server(s) 1004 are operatively connected to one or more server data store(s) 1010 that can be employed to store information local to the servers 1004.

The client(s) 1002 can include the client 204, and the server(s) 1004 can include the performance management server application 202, and the remote authentication service 502, for example, and storage component 108 can include the server data store(s) 1010.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A computer-implemented data security system, comprising:
    memory storing computer-executable components including:
        a definition component for defining cell-level security attributes for cells of a data table having rows and columns, wherein cell-level security attributes for a cell that is in a row having one or more other cells and in a column having one or more other cells can be defined for blocking access to data of the cell but allowing access to data of the other cells in the row and to data of the other cells in the column;
        a storage component for storing the cell-level security attributes as security metadata; and
        a security component for applying the security metadata to results of a query from a user to return filtered results based on the user; and
    a processor for executing the computer-executable components stored in memory.

2. The system of claim 1, wherein the security component applies the security metadata to dimensions and measures of a data cube based on the user query.

3. The system of claim 1, wherein the cell-level security attributes are defined on a per-user basis.

4. The system of claim 1, wherein the cell-level security attributes include read access, read-contingent, read/write access, or no access to the cells.

5. The system of claim 1, further comprising a user interface via which a user can interact with a cell of a data cube to define the cell-level security attributes for the cell of the data cube.

6. The system of claim 1, wherein:
    the definition component defines the cell-level security attributes for a security model that includes existing dimension attributes for a data cube, and
    the storage component stores the cell-level security attributes and the existing dimension attributes for the data cube as security metadata for the data cube.

7. The system of claim 1, wherein:
    the security metadata is stored as a set of security tables, the security tables include dimension tables and cell tables, and
    the cell tables include a table of cell permissions, a table of cell qualifiers, and a table of both cell permissions and cell qualifiers.

8. The system of claim 1, wherein the computer-executable components are part of a performance management application for securing cells of a data cube on a per-user basis.

9. A computer-readable storage medium storing computer-executable instructions that, when executed, cause a computing device to perform a computer-implemented method for securing data, the method comprising:
    defining cell-level security attributes for cells of a data table having rows and columns, wherein cell-level security attributes for a cell that is in a row having one or more other cells and in a column having one or more other cells can be defined for blocking access to data of the cell but allowing access to data of the other cells in the row and to data of the other cells in the column;
    storing the cell-level security attributes as security metadata; and
    applying the security metadata to results of a query from a user to return filtered results based on the user.

10. The computer-readable storage medium of claim 9, wherein:
    the security metadata is stored as a set of cell tables, and
    the cell tables include a table of cell permissions, a table of cell qualifiers and, a table of both cell permissions and cell qualifiers.

11. The computer-readable storage medium of claim 9, wherein:
    the cell-level security attributes include read access, read-contingent, read/write access, or no access to the cells, and
    the security metadata is applied on a per-user basis to return the filtered results as a secured data cube for the user.

12. The computer-readable storage medium of claim 9, further storing computer-executable instructions for presenting a user interface via which cell-level security attributes for a specific user can be assigned to dimensions and measures of a data cube to return a secured data cube for the specific user.

13. The computer-readable storage medium of claim 9, wherein the filtered results are returned as a secured data cube.

14. The computer-readable storage medium of claim 13, wherein the cell-level security attributes for a cell of the secured data cube are exposed when the user interacts with the cell of the secured data cube.

15. A computer-implemented method of securing data, comprising:
    presenting, by a computing device, a user interface for assigning cell-level security attributes to cells of a data table having rows and columns, wherein cell-level security attributes for a cell that is in a row having one or more other cells and in a column having one or more other cells can be defined for a specific user to block access by the specific user to data of the cell but to allow access by the specific user to data of the other cells in the row and to data of the other cells in the column;
    storing, by the computing device, cell-level security attributes defined for the specific user as security metadata in a data store;
    receiving, at the computing device, a query from the specific user;
    applying, by the computing device, the security metadata to results of the query to return filtered results based on the specific user; and
    exposing, by the computing device, the filtered results to the specific user.

16. The method of claim 15, further comprising:
defining and storing the cell-level security attributes as security metadata in a performance management server data store via a web service interface, wherein:
  the cell-level security attributes include at least one of read access, read-contingent, read/write access, or no access to the cells, and
  the security attributes are applied on a per-user basis to dimensions and measures of a data cube.

17. The method of claim 15, further comprising:
storing the security metadata as a set of cell tables; and
adding the cell tables to a security model that includes existing dimension tables, wherein the cell tables include:
  a table of cell permissions,
  a table of cell qualifiers, and
  a table of both cell permissions and cell qualifiers.

18. The method of claim 17, further comprising:
storing a user identifier of the specific user in the tables to link the cell tables to the specific user.

19. The method of claim 15, further comprising:
authenticating the specific user via remote authentication; and
authorizing the specific user via local authorization.

20. The method of claim 15, wherein:
the security metadata is stored as a set of security tables,
the security tables include dimension tables and cell tables,
the dimension tables include dimension security attributes related to users, roles, data permissions, model permissions, user properties and user roles, and
the cell tables include cell security attributes related to cell permissions, cell qualifiers, and a combination of cell permissions and cell qualifiers.

* * * * *